No. 812,497. PATENTED FEB. 13, 1906.
R. G. JAHNKE.
NUT LOCK.
APPLICATION FILED JULY 19, 1905.

Witnesses
Inventor
Rudolf Gustav Jahnke
By Wood & Wood
Attorneys

UNITED STATES PATENT OFFICE.

RUDOLPH GUSTAV JAHNKE, OF CINCINNATI, OHIO, ASSIGNOR OF ONE-HALF TO JOHN BENEKE, OF CINCINNATI, OHIO.

NUT-LOCK.

No. 812,497.     Specification of Letters Patent.     Patented Feb. 13, 1906.

Application filed July 19, 1905. Serial No. 270,401.

*To all whom it may concern:*

Be it known that I, RUDOLPH GUSTAV JAHNKE, a citizen of the United States, residing at Cincinnati, in the county of Hamilton and State of Ohio, have invented certain new and useful Improvements in Nut-Locks, of which the following is a specification.

My invention relates to an improved nut-lock, the features of which are more fully set forth in the description of the accompanying drawings, forming a part of this specification, in which—

Figure 1:
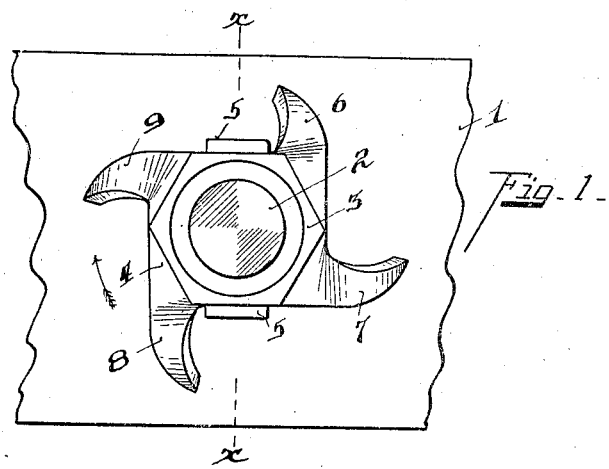
Figure 2:
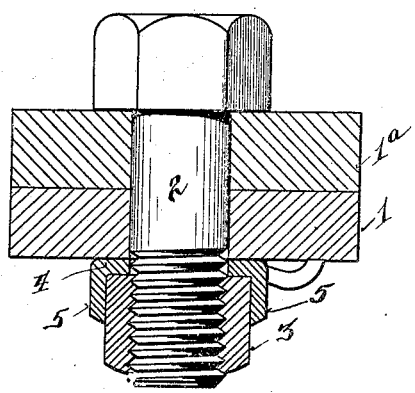
Figure 3:
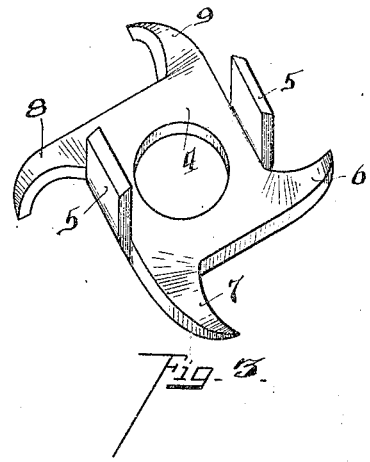

Figure 1 is a top plan view. Fig. 2 is a section on line $x\ x$, Fig. 1. Fig. 3 is a perspective view of the washer.

1 1ª represent the plates to which the nut-lock is applied for illustration.

2 represents the bolt through the plates.

3 represents the nut on the screw-threaded end of the bolt.

4 represents the nut-lock, which is a resilient washer through which the bolt passes. The washer has the spurs 5 engaging opposite sides of the nut 3. The base of the washer is provided with the spurs 6 7 8 9, one projected from each corner of the substantially rectilineal washer. It will be observed that these spurs have a spiral turn in the same direction in which the nut is rotated in tightening and that they are projected radially different distances from the center of the washer—that is, if the washer were rotated on its center so that the spurs would scratch the plate 1 they would describe four circles of different diameter. The spirality of the spurs is such relative to the pitch of the thread of the bolt and nut that in turning up the nut the curved edges of the spurs would be in advance, as indicated by the arrow in Fig. 1, and the washer could be freely rotated on the surface of the plate; but after tightening any rotation of the nut 3 in the direction of unscrewing would cause the washer to advance, in which direction each spur would be presented pointwise to the surface of the plate and would bur into the same. As each spur is on a different radius, each would take an independent bite into the surface of the plate and would thus effectually prevent any unscrewing of the nut from the bolt. The spurs are also turned in from the base toward the element to be secured, whereby when the washer is placed on the plate it seats on the points of the spurs. When the nut is turned up, the resiliency of the washer adds to the clamping action and to the bite of the lock.

Having described my invention, I claim—

1. In a nut-lock, a nut, a resilient washer having two of its opposite sides formed with outwardly-turned straight flanges on the edges of the washer adapted to engage the sides of the nut, there being spurs projected from the outer edges of the washer between the flanges which are spirally inclined in the direction of rotation of tightening the nut, and the points of which are bent inward, substantially as described.

2. In a nut-lock, a nut, a resilient washer having flanges bent outwardly from opposite sides thereof, which engage against opposite sides of the nut and hold the nut between them, spurs radially extended from the edges of the washer, said spurs being projected serially longer so that their points lie in different concentric circles around the outside of the nut, the points of said spurs being spirally inclined in the direction of rotation of tightening the nut, and inwardly bent, substantially as described.

In testimony whereof I have hereunto set my hand.

RUDOLPH GUSTAV JAHNKE.

Witnesses:
    OLIVER B. KAISER,
    LUISE BECK.